Nov. 4, 1958

J. CABLUCK 2,858,951

BOAT TRAILERS

Filed July 19, 1957

INVENTOR.
Johnny Cabluck
BY
Wm. T. Wofford
Attorney

Nov. 4, 1958     J. CABLUCK     2,858,951
BOAT TRAILERS
Filed July 19, 1957     2 Sheets-Sheet 2
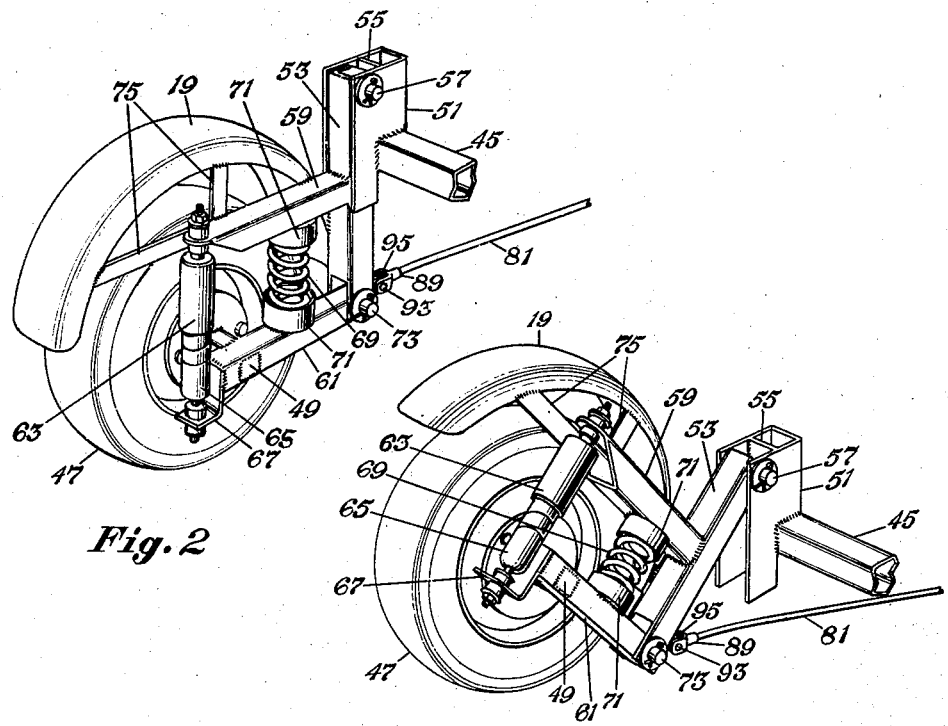
Fig. 2
Fig. 3
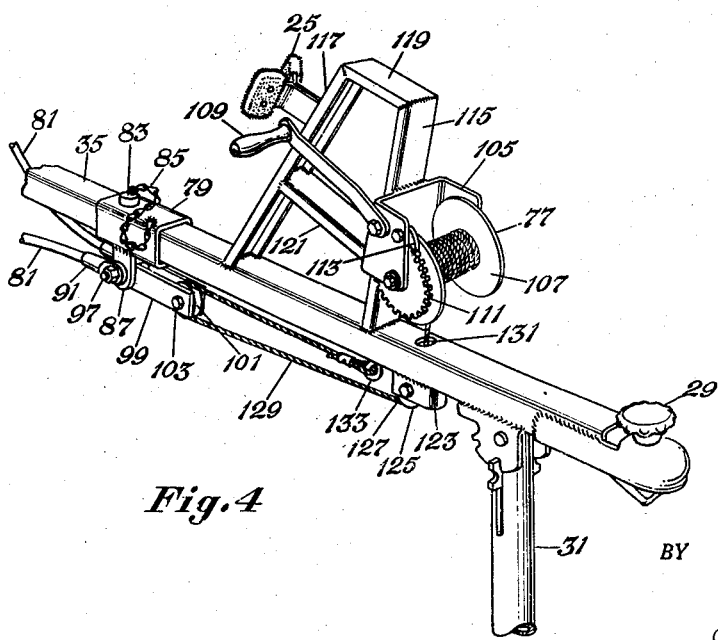
Fig. 4
INVENTOR.
Johnny Cabluck
BY Wm. T. Wofford
Attorney

United States Patent Office 2,858,951
Patented Nov. 4, 1958

2,858,951
BOAT TRAILERS

Johnny Cabluck, Fort Worth, Tex.

Application July 19, 1957, Serial No. 672,961

5 Claims. (Cl. 214—505)

My invention relates to improvements in boat trailers, and particularly to boat trailers adapted for transporting boats of the size and type commonly used on inland lakes for fishing and sport, and usually kept at the owner's home and towed by conventional automobile to and from the various lakes frequented by the owner.

It is the general object of my invention to provide an improved boat trailer of the type abovementioned.

Another object of my invention is to provide a boat trailer incorporating convenient and effective means for loading and unloading a boat.

Another object of my invention is to provide the boat trailer of simple, rugged, and economical structure.

Another object of my invention is to provide a boat trailer having improved mechanism and arrangement for raising and lowering the trailer platform to facilitate the loading and unloading of the boat.

These and other objects are effected by my invention as will be apparent from the following description taken in accordance with the accompanying drawing, forming a part of this application, in which:

Fig. 2 is a schematic perspective view showing structure of a portion of the trailer platform elevating mechanism in the traveling position;

Fig. 3 is a schematic perspective view showing structure of a portion of the trailer platform elevating mechanism in the loading and unloading position; and Fig. 4 is a schematic perspective view showing the winch portion of the trailer platform elevating mechanism.

Figure 1:
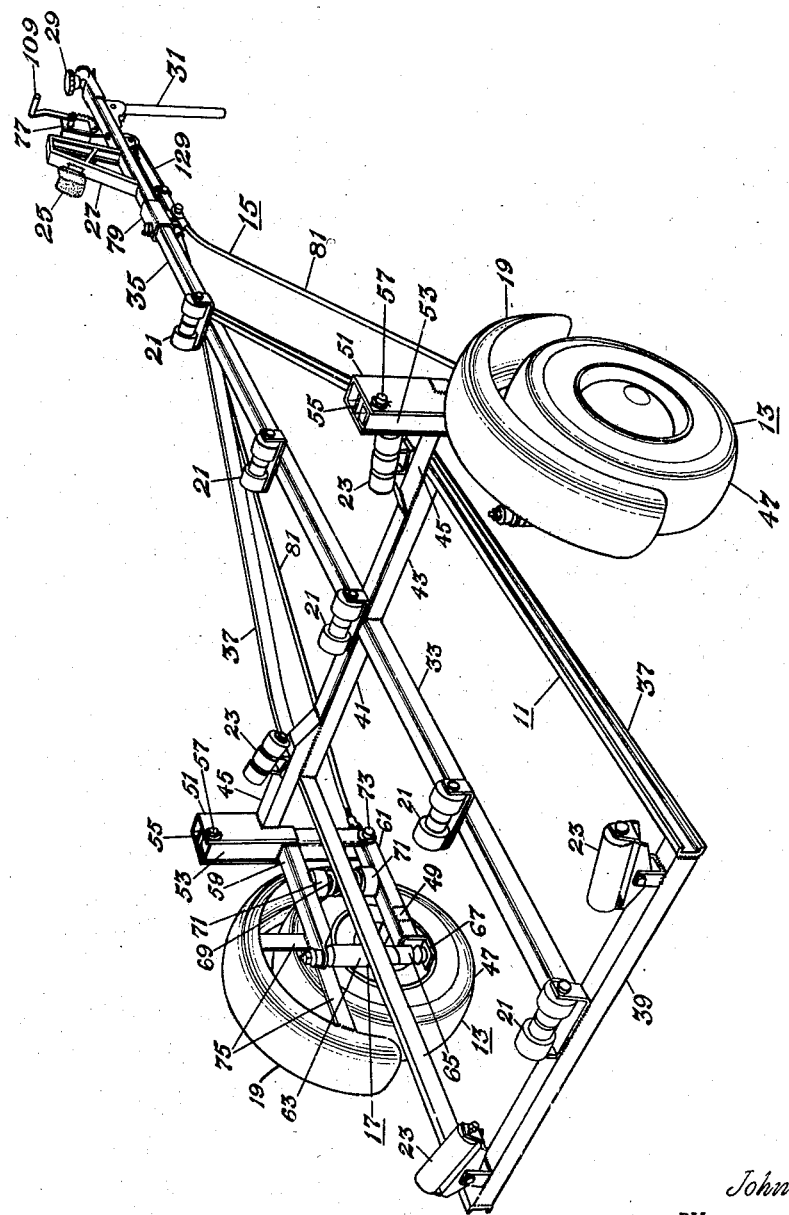
Fig. 1 is a schematic perspective view showing a boat trailer in accordance with a preferred embodiment of my invention.

Referring now to the drawings and particularly to Fig. 1, there is shown a boat trailer comprising a trailer platform 11, wheel assemblies 13, elevator assembly 15, shock absorber assemblies 17, fenders 19, boat keel rollers 21, boat cradle rollers 23, winch support 27, boat front end stop pad 25, trailer hitch 29, boat tow winch (not shown), and trailer front stand 31.

The trailer platform 11 comprises a centrally disposed box beam 33 which extends the entire length of the trailer and the front end portion of which acts as the trailer tongue 35. A pair of side beams 37 having U-shaped cross section extend one on each side of the center box beam 33 and parallel to it from the box beam rear end to a point just forward of the wheel assemblies 13, and then taper inwardly to join the box beam at the rear end of the tongue portion. An end box beam 39 extends transversely of the center and side beams 37 and bridges between the ends of the side beams and is welded to them. The rear end of the center beam 33 abuts the end beam 39 and is welded thereto. A pair of intermediate box beams 41, 43 extend transversely of the center and side beams, one between each side beam 37 and the center beam 33 at a point just rearward of the point where the side beams begin their inward taper. Each intermediate beam 41, 43 abuts the center beam at one end and the respective side beam 37 at the other end and is welded thereto. A wheel assembly support stub box beam 45 is fixed by welding to the top side of each intermediate box beam 41, 43 and extends a short distance outwardly therefrom and is parallel thereto. Each wheel assembly 13 comprises a rubber tired wheel 47 mounted on a stub axle 49. The elevator assembly 15 includes a pair of elevator support pedestals 51 and a pair of elevator tilt arms 53. Each elevator support pedestal 51 is a short open faced box beam having a longitudinally extending stiffener partition 55 parallel to the open face. Each support pedestal 51 is provided with a notched portion at its lower front side, and one support pedestal 51 is fixed by welding in upright position at the end portion of each stub box beam 45, with the notch abutting the top and rear surfaces of the respective stub box beam. Each elevator tilt arm 53 is a box beam which is pivotally mounted by a journal pin 57 at its upper end to the upper end of the channel formed by the sides and partition of a respective support pedestal 51. The tilt arm 53 depends from its pivot 57 extending well below the pedestal 51. The lower end of the tilt arm 53 has a portion of the back removed so that the remaining side extensions form a yoke. The shock absorber assembly 17 includes a stiff arm 59, a pivoted arm 61, a shock absorber cylinder 63, a shock absorber piston arm 65, a piston arm support bracket 67, a coil spring 69, and spring end housings 71. The stiff arm 59 is a box beam which is fixed to the rear face of the respective tilt arm 53 just below the stub beam level and extends rearwardly from and perpendicular to the tilt arm 53. The pivoted arm 61 is also a box beam having one end pivoted at the yoke on the lower end of the tilt arm 53 on a journal pin 73 and extending rearwardly therefrom. The piston arm support bracket 67 is an L-shaped plate having its upright side abutting the rear end of the pivoted arm 61 and welded thereto, with its horizontal side forming a platform to which the lower end of the piston arm 65 is fixed. The shock absorber cylinder 63 is fixed at its upper end to the rear end of the stiff arm 59. Interposed between the stiff arm 59 and the pivoted arm 61 near their forward ends is the coil spring 69, which is held in place by end cups 71 fixed one to the stiff arm 59 and one to the pivoted arm 61. The wheel assembly stub axle 49 is fixed at its end portion to the pivoted arm 61 adjacent its rear end portion and extends outwardly and laterally from the respective pivoted arm and perpendicular thereto. A fender 19 is mounted over each wheel 47 and is supported by brace members 75 which are fixed to the stiff arm 59. The elevator assembly further includes an elevator winch 77, a winch cable and sheave assembly, a slidable sleeve 79, and a pair of tension rods 81. The slidable sleeve 79 surrounds the tongue 35 and is free to slide on the tongue in the region between the winch mount 27 and the junction of the platform side beams 37 and the tongue 35. The slidable sleeve 79 may be locked to the tongue in travel position by means of a pin 83 which may be dropped in a hole which extends vertically through the sleeve 79 and the tongue 35. The pin is fixed to a short safety chain 85 which is fixed to the sleeves. A pair of parallel spaced ears 87 depend from the sleeve 79 and are welded thereto, and form a sleeve yoke. Each tension rod 81 is threaded at its rear end into a respective rear clevis 89 and at its forward end into a respective forward clevis 91. The rear clevis 89 in each case is pivotally fixed by a pin 93 to an ear 95 which is fixed to the lower end of the front face of a respective tilt arm 53 and extends forwardly therefrom. The front clevis 91 is in each case pivotally fixed by a pin 97 to the sleeve yoke. Also pivotally fixed at its rear end to the sleeve yoke is a rear sheave support 99 comprising a pair of parallel spaced strap members. A rear sheave 101 is journaled to said sheave support at its front end portion by means of a pin 103. The elevator winch 77 is a conventional type comprising a mount bracket 105, a cable drum 107 journaled on the mount bracket, a crank 109 driving the drum through a gear 111 and pinion (not shown), with a ratchet lock 113. The winch mount 27 hereinbefore mentioned is made up of channel members including a front member 115 fixed to the top surface of the tongue 35 and extending upwardly therefrom, a rear member 117 fixed to the top surface of the tongue and extending upwardly and forwardly therefrom, a top member 119 bridging between the upper ends of the front and rear members, and an internal brace member 121. The elevator winch bracket is welded at its rear face to the front face of said front winch support member 115. A front sheave support 123 is fixed to the underside of the tongue 35 below the winch cable drum 107. A front sheave 125 is journaled in said support 123 by a pin 127. A cable 129 is wound on the drum 107 and is dead ended at one end on the drum. The other end of the cable 129 extends off a drum downward through a slot 131 in the tongue, under the front sheave 125, rearward under and over the rear sheave 101, and forward to a dead end 133 on the tongue underside just rearward of the front sheave support 123.

A conventional boat tow winch (not shown) may be fixed to the top member 119 of the winch mount 27. The boat front end stop pad is fixed to the rear member 117 of the winch mount 27 and extends rearwardly therefrom forming a padded V which contacts the boat keel. The boat keel rollers 21 are of a conventional type and are mounted at spaced intervals along the platform center box beam 33. The boat cradle rollers 23 are also of a conventional type, two of which are mounted on rocking pivots on a platform rear box beam 39, one adjacent each end thereof. The other two cradle rollers 33 are mounted one on each stub beam 45.

To load a boat on the trailer, assuming the platform to be in its lowered, or load position, the boat is first towed up onto the trailer by means of the boat tow winch (not shown). The elevator winch 77 is then operated to pull the slidable sleeve 79 forward on the tongue 35 by means of the cable and sheave apparatus. The sleeve 79 pulls the tension rods 81 forward, forcing the tilt arms 53 toward the upright position, which pulls the wheel assemblies 13 forward, and raises the platform 11. When the tilt arms 53 have reached their extreme forward travel, being received in and stopped by the pedestal channels, the sleeve 79 is also at its extreme forward, or travel position, and the lock pin 83 is dropped into place, locking the sleeve 79 to the tongue 35. To unload the boat, the lock pin 83 is removed and the winch 77 is backed down, with the tilt arms 53 tending to remove rearward at their lower end, thus lowering the platform 11. When the platform has been lowered, the boat is merely pushed rearward off the trailer, rolling on the keel rollers 21.

It will be apparent from the foregoing that I have provided an improved boat trailer of simple, rugged, and economical structure and incorporating an effective mechanism and arrangement for raising and lowering the trailer platform to facilitate the loading and unloading of the boat.

While I have shown my invention in only one form, it will be obvious to those skilled in the art that it is not so limited, but is susceptible of various changes and modifications without departing from the spirit thereof.

I claim:

1. A boat trailer comprising a trailer platform, a tongue, a pair of pedestals supported from said platform and disposed one on each side laterally of said platform and extending upwardly above the platform level, a respective pivot arm pivotally fixed to the upper end portion of a respective pedestal and depending therefrom so as to pivot about a horizontal axis rearwardly from said respective pedestal, a wheel assembly supported from each said pivot arm, a winch supported on said tongue, and means connecting said winch to the lower end of said pivot arm, whereby said platform will be raised when said pivot arms are pulled forward by said winch and connecting means.

2. A boat trailer comprising a trailer platform, a tongue, a pair of pedestals supported from said platform and disposed one on each side laterally of said platform and extending upwardly above the platform level, a respective pivot arm pivotally fixed to the upper end portion of a respective pedestal and depending therefrom so as to pivot about the horizontal axis rearwardly from said respective pedestal, a wheel assembly supported from each said pivot arm, a winch supported on said tongue, a sleeve slidably fixed to said tongue, means for connecting said winch to said sleeve, and means connecting said sleeve to the lower end of each said pivot arm, whereby said platform will be raised as said sleeve is moved forward on said tongue by said winch.

3. A boat trailer comprising a trailer platform, a tongue, a pair of pedestals supported from said platform and disposed one on each side laterally of said platform and extending upwardly above the platform level, a respective pivot arm pivotally fixed to the upper end portion of a respective pedestal and depending therefrom so as to pivot about a horizontal axis rearwardly from said respective pedestal, a wheel assembly supported from each said pivot arm, a winch supported on said tongue, a sleeve slidably fixed to said tongue, a first sheave fixed to said tongue, a second sheave fixed to said sleeve, cable extending off the drum of said winch and over said sheaves and dead-ended on said tongue, and means connecting said sleeve to the lower end of each said pivot arm, whereby said platform will be raised as said sleeve is moved forward on said tongue by said winch.

4. A boat trailer comprising a trailer platform, a tongue, a pair of pedestals supported from said platform and disposed one on each side laterally of said platform and extending upwardly above the platform level, a respective pivot arm pivotally fixed to the upper end portion of a respective pedestal and depending therefrom so as to pivot about a horizontal axis rearwardly from said respective pedestal, a stiff arm fixed to said pivot arm and extending rearwardly therefrom and perpendicular thereto, a shock absorber pivot arm pivotally fixed to the lower end of said first mentioned pivot arm and extending rearwardly therefrom, a shock absorber bridging the free ends of said stiff arm and said shock absorber pivot arm, a wheel assembly having a stub axle, with said axle being fixed to the rear end portion of said respective shock absorber pivot arm, a winch supported on said tongue, and means connecting said winch to the lower end of said pivot arm, whereby said platform will be raised when said pivot arms are pulled forward by said winch and connecting means.

5. A boat trailer comprising a trailer platform, a tongue, a pair of pedestals supported from said platform and disposed one on each side laterally of said platform and extending upwardly above the platform level, each said pedestal comprising a short box beam of substantially U-shaped cross section and having an open face on its rearward side, a partition centrally disposed in said box beam and parallel to the front side thereof, a respective pivot arm pivotally fixed to the upper end portion of a respective pedestal and depending therefrom so as to pivot about a horizontal axis rearwardly from said respective pedestal, said pivot arm being received by the channel formed by the sides of said pedestal and said partition when the platform is in travel position, a wheel assembly supported from each said pivot arm, a winch supported on said tongue, and means connecting said winch to the lower end of said pivot arm, whereby said platform will be raised when said pivot arms are pulled forward by said winch and connecting means.

References Cited in the file of this patent

UNITED STATES PATENTS 2,788,908    Lynd _____ Apr. 16, 1957

FOREIGN PATENTS 804,535    Germany _____ Apr. 26, 1951